United States Patent
Sun et al.

(10) Patent No.: US 8,234,158 B1
(45) Date of Patent: Jul. 31, 2012

(54) ANALYZING TEXT STREAMS FOR CUE POINTS OF ADVERTISEMENTS IN A MEDIA STREAM

(75) Inventors: Yaojun Sun, South Riding, VA (US); Lyle T Bertz, Lee's Summit, MO (US); Chuma Ubakaeze Agogbua, Herndon, VA (US); Christopher J. Mateski, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 828 days.

(21) Appl. No.: 12/116,644

(22) Filed: May 7, 2008

(51) Int. Cl.
*G06Q 40/00* (2012.01)
(52) U.S. Cl. ........................................................ 705/14
(58) Field of Classification Search .................. 705/14
See application file for complete search history.

(56) References Cited

U.S. PATENT DOCUMENTS

| | | | |
|---|---|---|---|
| 2006/0282465 A1* | 12/2006 | Sharma | 707/104.1 |
| 2007/0064739 A1* | 3/2007 | Krishnamachari | 370/486 |
| 2007/0094081 A1* | 4/2007 | Yruski et al. | 705/14 |

* cited by examiner

Primary Examiner — Charles Kyle
Assistant Examiner — Clifford Madamba

(57) ABSTRACT

A method, system, and apparatus are provided for integrating advertisements with a multimedia stream to create a resultant media stream. The depicted embodiments analyze a text-based data stream a multimedia stream to identify advertisement insertion points. Further, the depicted embodiments communicate with a rule-based database to acquire cue requirements and an advertising database to receive the advertisements. The cue requirements are used to incorporate the advertisements into with the multimedia stream to produce a resulting content stream. The resulting content stream may be provided to a user and/or computing device.

18 Claims, 5 Drawing Sheets

ANALYZING TEXT STREAMS FOR CUE POINTS OF ADVERTISEMENTS IN A MEDIA STREAM

SUMMARY

The present invention is defined by the claims below. Embodiments of the present invention solve at least the problem of quickly analyzing media streams to distribute relevant advertisements, and enforcing advertising rules to integrate advertisements into a multimedia stream.

In a first aspect, media having computer-useable instructions embodied therein performs a method of communicating advertisements integrated with a multimedia stream. The multimedia stream and a text-based stream are received. The text-based stream is searched for keywords. The keywords are communicated to an advertising rule database. Cue requirements are received from the advertising rule database based on the keywords. Advertisements are received to cue for play. The cue requirements and the advertisements are integrated with the multimedia stream to provide a resulting media stream.

In another aspect, a system for delivering advertisements in a media stream is provided that includes a splicing mechanism, with the processor coupled to the memory, having a keyword dictionary and a cue analyzer. The cue analyzer operates to compare a text-based data stream to the keyword dictionary to determine advertisement opportunities. A content source operates to provide a media content stream and the text-based data stream. A primary channel is in communication with the content source and the splicing mechanism to deliver the media content stream to the splicing mechanism. A secondary channel is in communication with the content source and the splicing mechanism to deliver the text-based data stream to the splicing mechanism. A rule-based database is in communication with the splicing mechanism. An advertisement database is in communication with the splicing mechanism to provide advertisements to the splicing mechanism to create a resultant media stream.

In yet another aspect, an apparatus capable of combining advertisements and a media stream is provided that includes a splicing mechanism with a processor coupled to a memory. A cue dictionary, located in the splicing mechanism, holds a set of predefined text words associated with advertisement opportunities. A cue analyzer, located in the splicing mechanism, determines the advertisement opportunities within the media stream based on a comparison of the incoming text words to the set of predefined text words. A primary input channel connected to the splicing mechanism delivers the media stream. A secondary input channel connected to the splicing mechanism delivers the incoming text words to the cue analyzer. An output channel connected to the splicing mechanism delivers an output content stream to a computing device.

It should be noted that this Summary is provided to generally introduce the reader to one or more select concepts described below in the Detailed Description in a simplified form. The Summary is not intended to identify key and/or required features of the claimed subject matter, nor is it intended to be used as an aid in determining the scope of the claimed subject matter.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
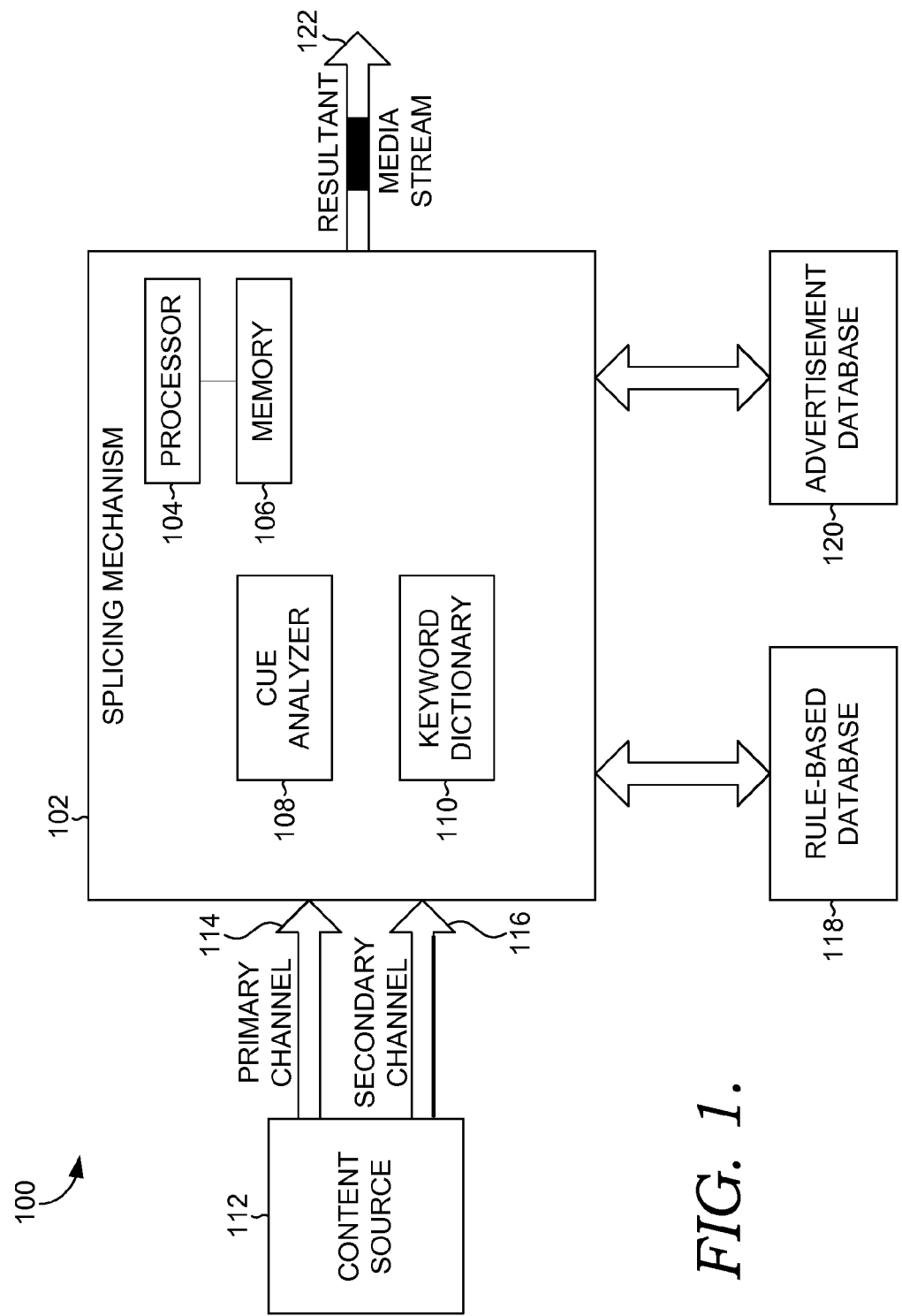
FIG. 1 illustrates a block diagram of an exemplary environment for practicing an embodiment of the present invention.

Embodiments of the present invention provide media, system, and apparatus for integrating advertisements into a multimedia stream. In particular, the embodiments are related to digital programming insertion in cable television broadcasting. A description of digital programming insertion may be found in specifications ANSI/SCTE 35 2004 Digital Programming Insertion Cueing Message for Cable by the Society of Cable Telecommunications Engineers, Inc. of Exton, Pa. and ANSI/SCTE 30 2006 Digital Program Insertion Splicing API by the Society of Cable Telecommunications Engineers, Inc. of Exton, Pa. which are herein incorporated by reference.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and combinations are of utility and may be employed without reference to other features and combinations and are contemplated within the scope of the claims. Not all steps listed in the various figures need to be carried out in the specific order described. Moreover, although the terms "step" and/or "block" may be used herein to connote different elements of methods employed, the terms should not be interpreted as implying any particular order among or between various steps herein disclosed unless and except when the order of the individual steps is explicitly described.

As one skilled in the art will appreciate, embodiments of the present invention may be embodied as, among other things: a method or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Further, various technical terms are used throughout this description. An illustrative resource that fleshes out various aspects of these terms can be found in *Newton's Telecom Dictionary* by H. Newton, 22$^{nd}$ Edition (2006).

Turning now to FIG. 1, an exemplary operating environment is observed for practicing the present invention and is referenced generally by the numeral 100. System 100 includes a splicing mechanism 102 with a processor 104 coupled to memory 106, a cue analyzer 108, and a keyword dictionary 110. A content source 112 is connected to the splicing mechanism 102 through a primary channel 114 and a secondary channel 116. The splicing mechanism 102 is also communicatively coupled to a rule-based database 118 and an advertisement database 120 to further provide a resultant media stream 122 on an output channel.

Splicing mechanism 102 includes a processor 104 coupled to the memory 106, cue analyzer 108, and keyword dictionary 110. Splicing mechanism 102 is a device for inserting advertisements into media streams or multimedia streams. Exemplary media streams and multimedia streams may include, but are not limited to, broadcast television, broadcast radio, audio streams, or video streams. For clarification purposes and not by means of limitation, a multimedia stream or media stream will be referred to as a media stream. Additionally, a media stream may include a single media stream or several media streams. Thus, for simplification purposes, an embodiment of a singular media stream is described herein. Splicing mechanism 102's operation is more fully addressed in the aforementioned references ANSI/SCTE 35 2004 and ANSI/SCTE 30 2006. The splicing mechanism 102 is but one example of a suitable splicing mechanism and is not intended to suggest any limitation to scope or use of functionality. Splicing mechanism 102 is also referred to as splicer which is discussed further in FIG. 2.

Cue analyzer 108 receives media stream on primary channel 114 and a text-based stream on secondary channel 116 to analyze the streams to identify a particular word or action to further determine the number of advertising opportunities in the media stream. One embodiment of the cue analyzer 108 includes searching for a specific word in the text-based stream. Cue analyzer 108 determines the number of advertising opportunities based on keyword dictionary 110. An advertising opportunity is a location where an advertisement may be inserted into the media stream. A further embodiment of cue analyzer 108 determines the number of advertisement insertion points in a media stream by comparing the text-based stream with keywords in keyword dictionary 110.

Keyword dictionary 110 includes a set of predefined text words. The cue analyzer 108 compares the text-based stream to the keyword dictionary 110 to determine the number of advertisement opportunities. For example, the text-based stream may contain the word "soft drink" which the cue analyzer 108 recognizes according to the keyword dictionary also containing the word "soft drink". The cue analyzer 108 determines the number of times the word soft drink is repeated in the text based stream, thus determining the number of advertising opportunities based on the word soft drink.

Content source 112 is coupled to the splicing mechanism 102 through the primary channel 114 and secondary channel 116. Content source 112 stores the media streams and text-based streams. One embodiment of the content source 112 includes converting the media stream to the text-based stream. Another embodiment of the content source 112 includes a database to store the media streams and the text-based streams, while other embodiments of the content source 112 include a file server.

Primary channel 114 is located between content source 112 and splicing mechanism 102. Embodiments of primary channel 114 include delivering media streams such as audio streams or video streams to splicing mechanism 102 using a packet delivery mechanism such as the Internet or real-time transport protocol (RTP).

Secondary channel 116 is located between content source 112 and splicing mechanism 102. Embodiments of secondary channel 116 include delivering text-based data streams or incoming text words to the cue analyzer 108 using a protocol such as RTP. Yet, further embodiments include secondary channel 116 delivering the text-based data stream to splicing mechanism 102 prior to primary channel 114 delivering the media stream to splicing mechanism 102. In this case, splicing mechanism 102 analyzes the text-based data stream prior to receiving the media stream so that the type of advertisements is determined and integrated quickly into media stream to produce the resultant media stream 122. In this seamless integration implementation, a user receives the resultant media stream 122 instantaneously.

Rule-based database 118 is communicatively coupled to splicing mechanism 102 to communicate advertising rules. One embodiment of the rule-based database 118 includes communicating advertisement prerequisites to the splicing mechanism 102. Another embodiment includes rule-based database 118 to provide cue requirements to integrate advertisements into the media stream. A further embodiment includes locating rule-based database 118 in splicing mechanism 102. Other embodiments of rule-based database 118 include a database to store cue requirements, while other embodiments of rule-based database 118 includes a server to communicate cue requirements to splicing mechanism 102. One example may include the rule-based database 118 communicating a signal or cue requirement which indicates an advertisement insertion point, which is the point to insert an advertisement into the media stream. In this case, the cue requirement indicates the signal to play an advertisement in the media stream. This signal may be directed toward a particular demographic group that is viewing the media stream. For example, the media stream that includes a cartoon may incorporate demographic specific advertisements such as toys into the media stream.

A further example of a cue requirement may include the type and the number of advertisements to be displayed for a certain time period. Another example may include the type of advertisement to be integrated into the media stream such as a takeover advertisement, an overlay advertisement, rich media advertisement, or a synched advertisement. These types of advertisements will be explained in more detail in FIG. 3.

Advertisement database 120 is communicatively coupled to splicing mechanism 102 to communicate advertisements. The advertisements are incorporated into the media stream by the splicing mechanism 102 to create the resultant media stream 122.

Resultant media steam 122 represents an output to deliver the media stream integrated with advertisements to a computing device. This output is shaded in FIG. 1 to demonstrate the integration of the primary channel with advertisements from an advertisement database 120. As discussed previously, the media stream includes a video stream or audio stream, so resultant media stream 122 represents advertisements in a video stream or audio stream. The advertisements in resultant media stream 122 may be an audio file, video file, or picture file. For example, an audio stream may include audio file advertisements.

Having briefly described an overview of the embodiments of the present invention, a scenario of integrating advertisements into a media stream is described herein. In an implementation of an embodiment of the present invention, a user may request for a specified media stream from content source 112. This is done when the user selects an audio or video while using their computing device. The content source 112 sends the requested media stream and converts the media stream into a text-based stream sent separately on secondary channel 116 to splicing mechanism 102. The cue analyzer 108 takes the text-based stream and searches for keywords in the keyword dictionary to determine the number of advertisement opportunities in the media stream. The number of advertisement opportunities and the keywords are sent to a rule-based database to determine a provider's advertisement requirements. Such requirements can include showing only two advertisements in a ten-minute media stream. Thus, the rules are communicated to the splicing mechanism 102. The splicing mechanism determines the specific advertisements to be used in the media stream and obtains the specified advertisements from the advertisement database 120. The advertisements are then integrated into the user-requested media stream at the splicing mechanism 102 to produce a resulting media stream. This approach occurs in milliseconds, providing a seamless session to the user viewing the resulting media with advertisements.

Figure 2:
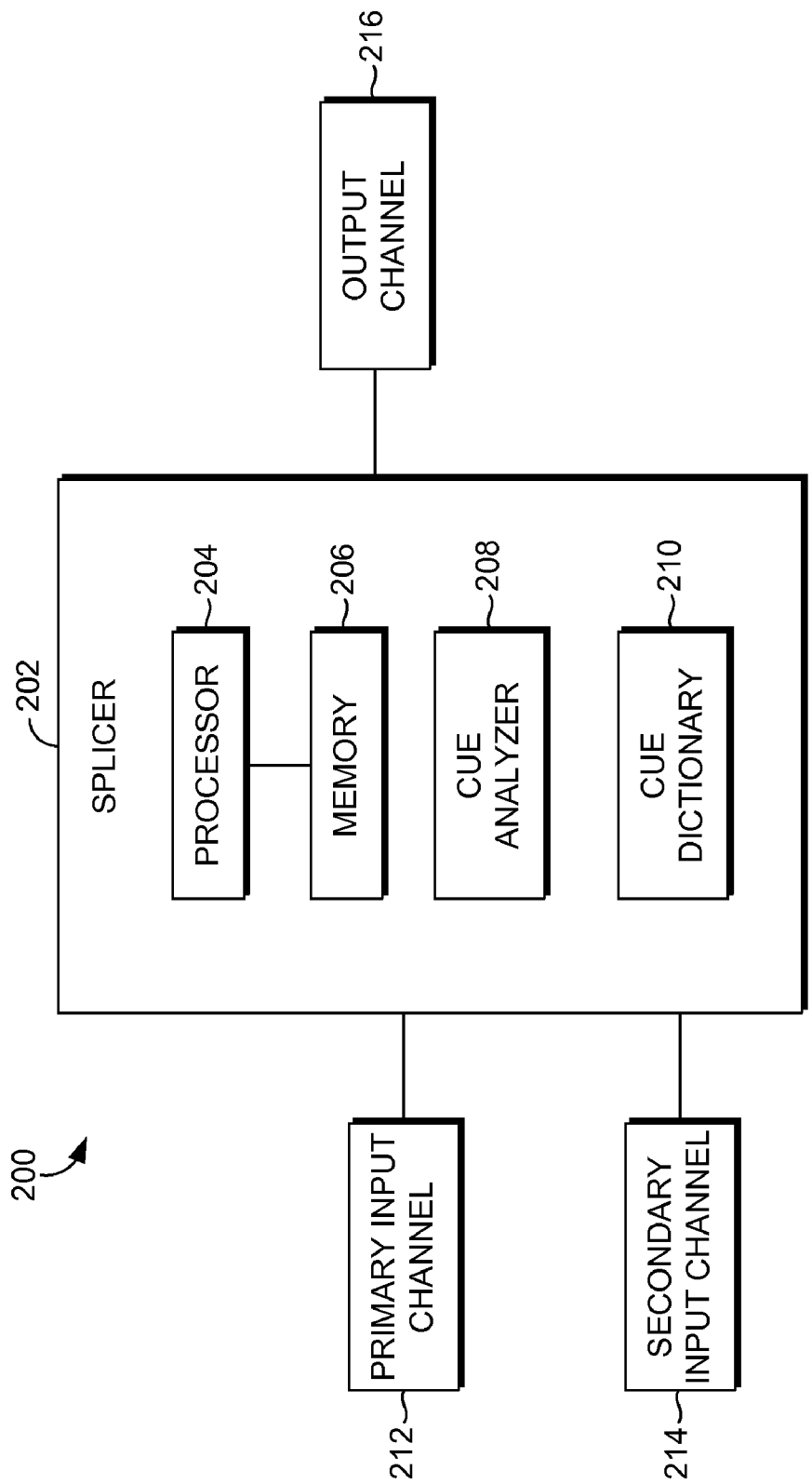
FIG. 2 illustrates a block diagram of an exemplary splicer for combining advertisements and a media stream in an embodiment of the present invention.

Referring now to FIG. 2, an exemplary splicing system 200 is shown with a splicer 202 containing a processor 204 coupled to memory 206, a cue dictionary 210, and a cue analyzer 208. The splicer 202 determines advertisement opportunities within a media stream by comparing incoming text words to a set of predefined text words in the cue dictionary 210. The splicer 202 is coupled to a primary input channel 212 to deliver a media stream to the cue analyzer 208, a secondary channel 214 to deliver incoming text words to the cue dictionary 210, and an output channel 216 to deliver an output content stream to a computing device.

Splicer 202, also referred to as splicing mechanism 102 as shown in FIG. 1, integrates advertisements into a media stream received from primary input channel 212 to produce an output content stream delivered on output channel 216. By way of background, a splicer is a device for inserting advertisements into a media stream. Splicer 202 integrates advertisements into media streams. Implementations of embodiments include receiving media content on primary input channel 212 and storing the content in memory 206 until integrating advertisements into the media stream. Additionally, splicer 202 includes cue analyzer 208 and cue dictionary 210 to receive the media stream and incoming text words to further determine the number of advertisement opportunities within the media stream. Advertisement opportunities are discussed in more detail in later figures.

Cue dictionary 210, also referred to as keyword dictionary 110 as shown in FIG. 1, holds a set of predefined text words which are associated with advertisement opportunities. Embodiments of cue dictionary 210 stores demographic specific words as specified by a service provider. One implementation of an embodiment includes a video stream that is a short cartoon. The demographic specific words may be toys or video games. In another implementation of an embodiment, a user may request a video stream of a basketball game. The demographic specific words may include basketball, energy drinks, or cars.

Cue analyzer 208, also seen in FIG. 1 as element 108, compares a text-based stream from the secondary input channel 214 to a set of predefined text words in cue dictionary 210 to determine the number of advertisement opportunities within the media stream. For example, assume a user requests a specific video of their favorite television show. The specific video stream is delivered to splicer 202 on primary input channel 212. The specific video stream is converted to incoming text words at content source 112 in FIG. 1 and delivered to cue analyzer 208 over the secondary input channel 214. Cue analyzer 208 compares the incoming text words to the set of predefined text words in cue dictionary 210.

Primary input channel 212, also seen in FIG. 1 as element 114, delivers the media stream to splicer 202. Primary input channel 212 may include delivering media content using real-time transport protocol (RTP) or another type of packet delivery mechanism. As mentioned previously, the media stream may include a video stream or audio stream. One embodiment of the primary input channel delivers the media stream before the text-based data stream on the secondary input channel. Other embodiments include the media stream being delivered after the text-based data stream has been delivered.

Secondary input channel 214, also seen in FIG. 1 as element 116, delivers incoming text words to cue analyzer 208. Secondary input channel 214 may include delivering incoming text words using a packet delivery protocol such as RTP. The incoming text words correspond to the media stream to determine the number of advertisement opportunities in the media stream. For example, the media stream may contain words such as a specific product. Thus, the incoming text words are sent as a separate stream from the media stream and are analyzed for that specific product. The number of times the specific product is produced as an incoming text word signifies the number of advertising opportunities. A further example includes the word "soft drink" mentioned in the video stream or audio stream. The number of times "soft drink" or type of soft drink, such as Pepsi® or Coke®, occurs in the incoming text words represents the number of advertising opportunities.

Output channel 216, seen as element 122 in FIG. 1, delivers an output content stream to a computing device. Output channel 216 may include delivering output content stream using a packet delivery protocol such as RTP or IP. Embodiments of the computing device may include but are not limited to a computer, television, mobile computing device, etc. Embodiments of the output content stream include the media stream, such as a video stream or audio stream, integrated with advertisements. One implementation of an embodiment includes a user requesting a video of basketball game. Advertisements containing basketballs, or other such sports paraphernalia advertisements, may be included in the basketball game media stream to create the output content stream.

Figure 3:
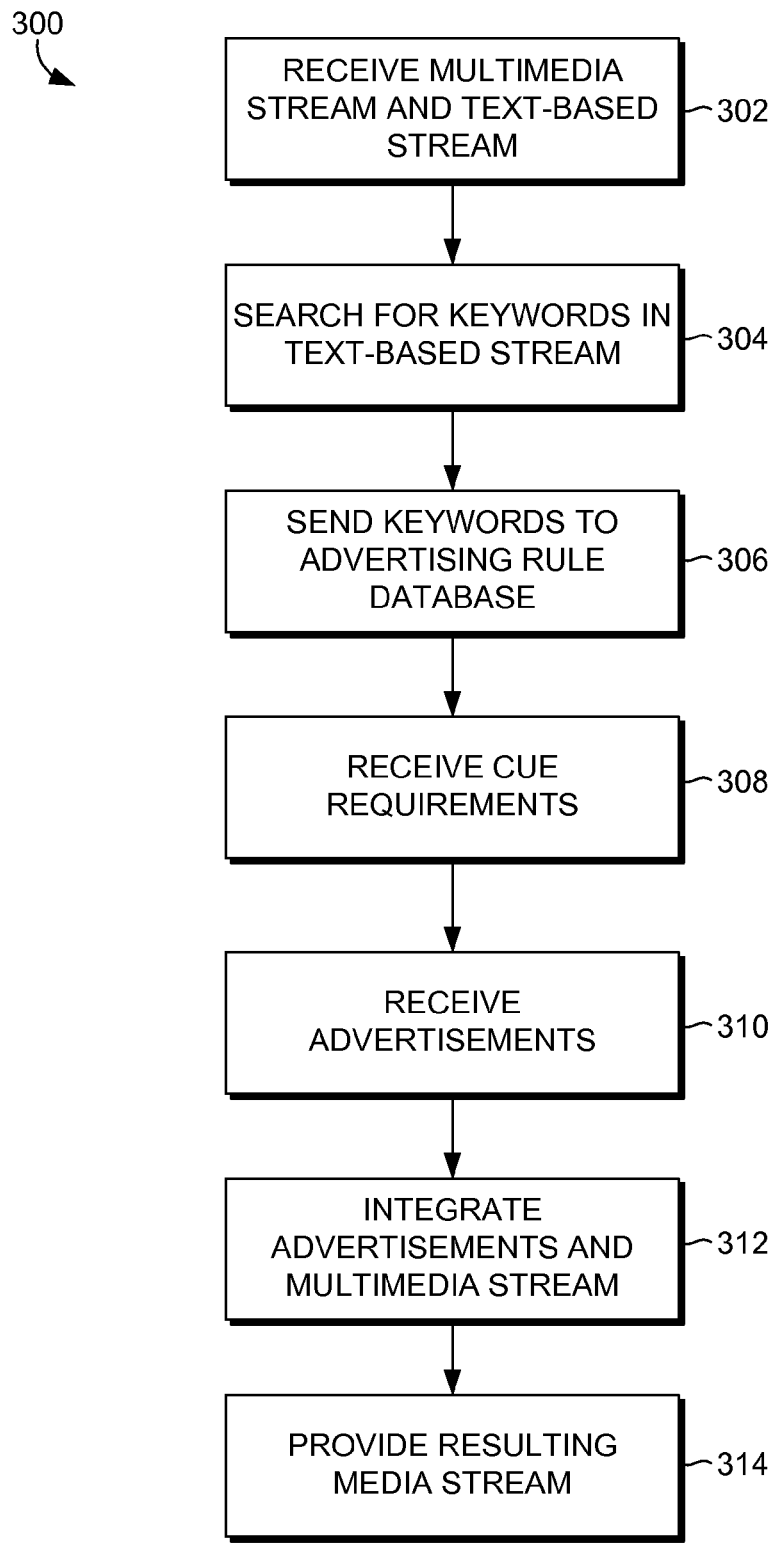
FIG. 3 depicts an illustrative flow diagram according to an embodiment of the present invention to communicate advertisements integrated with a multimedia stream.

In an implementation of an embodiment of the present invention, a method of integrating advertisements with a multimedia stream is depicted by the process 300 of FIG. 3. The process begins at step 302 to receive at a splicing mechanism a multimedia stream and a text-based stream from a content source. Step 304 includes a cue analyzer searching for keywords in the text-based data stream and then sends the keywords to an advertising rule database at step 306. Step 308 receives the cue requirements, such as advertisement organization rules, from the rule-based database. Step 310 receives the advertisements from an advertisement database and step 312 integrates the received advertisements into the previously received multimedia stream to create a resulting media stream at step 302. Step 314 provides the resulting media stream to a user and/or computing device.

At step 302, a multimedia stream and a text-based stream are received. Embodiments of the present invention include the splicing mechanism 102 as in FIG. 1 receiving the multimedia stream on a primary channel 114 and the text-based stream on a secondary channel 116 from content source 112. The text-based stream also includes but should not be limited to a text-based data stream or incoming text words. For clarification purposes, the text-based data stream will also be referred to as the text-based stream. As the name implies, the text-based stream is a text-based stream conversion of the multimedia stream on the primary channel 114. The multimedia stream or the media stream is converted at the content source 112 and then delivered as the text-based stream on the secondary channel 116. For example, a basketball game media stream may be delivered on the primary channel 114 to the splicing mechanism 102 and the content source 112 may convert the basketball game media stream to a text-based stream to include words such as basketball, comments, etc., to be delivered on the secondary channel 116 to splicing mechanism 102.

At step 304, the method searches for keywords in the text-based stream. Embodiments of step 304 include a cue analyzer 108 in FIG. 1 searching for keywords by comparing the text-based stream received from the content source 112 on a secondary channel 116 to a keyword dictionary 110. In following with the previous example, the keyword dictionary may have predefined keywords such as basketball or other sports related words. Thus, the basketball game text-based stream may be compared to find such keywords as basketball and other similar sports related words.

At step 306, the keywords found in step 304 are communicated from the splicing mechanism 102 to an advertising rule database 118 as in FIG. 1. As mentioned previously, the advertising rule database 118 also includes a rule-based database on a storage medium of a computer, a file server, or collection of file servers. Embodiments of step 306 include communicating the keywords to the rule-based database; other embodiments include communicating meta-information representing the keywords to the rule-based database. A further embodiment of step 306 includes determining the number of advertising opportunities by determining the number of keywords found in step 304. Yet still, a further embodiment of the step 306 includes searching for advertisement insertion points.

In step 308, cue requirements are received from the advertising rule database based on the communicated keywords in step 306. Embodiments of step 308 include a splicing mechanism 102 as in FIG. 1 receiving the cue requirements to determine when to insert advertisements into the media stream. Embodiments of the cue requirements include but should not be limited to advertising organization rules, advertising placement rules, or other advertising cue regulation information. One example of the cue requirements may include regulatory information specifying how many advertisements to insert for a particular time period in the media stream. Another example may include what type of advertisement to use such as an overlay advertisement, a takeover advertisement, a synched advertisement, or a rich media advertisement. These types of advertisements are explained more at step 310. Using the previous basketball game media stream example, the cue requirements may include information such as limiting the number of advertisements to be integrated into the basketball game media stream.

In step 310, advertisements are received to cue for play. Embodiments of step 310 include the splicing mechanism 102 communicating with an advertisement database 120 as seen in FIG. 1 to identify specific advertisements to insert into the media stream. In this embodiment, the advertisement database 120 manages the advertisements by giving each advertisement a unique identification such as an electronic serial number or other sort of content identifier to uniquely identify each advertisement. As mentioned previously, embodiments of advertisements include a takeover advertisement, an overlay advertisement, a rich media advertisement, or a synched advertisement. The takeover advertisement is an advertisement when the media stream is paused and advertisement is played, during which time there are no ways to interact with the advertisement. The overlay advertisement is semi-transparent and takes up a limited space on a user's and/or computing device's screen display. These are considered interactive since a hyperlink is included for a user to click with an input device such as a mouse to navigate the user to a particular website. The synched advertisement is considered media stream dependent. One example includes playing a pizza commercial during or after the mention of the word dinner on a video stream in another location on the screen. Lastly, the rich media advertisement is a static advertisement such as a banner advertisement and is independent of any media stream, thus these types of advertisements are not typically relevant to any media stream.

At step 312, the received advertisements in step 310 are integrated with the media stream received in step 302. Embodiments of step 312 include the splicing mechanism 102 integrating the received advertisements from the advertisement database 120 and the media stream on the primary channel 114 in FIG. 1 to create the resulting media stream 122. One example includes incorporating basketball specific advertisements into the basketball game media stream.

At step 314, the resulting media stream is provided. Embodiments of step 314 include providing the resulting media stream to a user and/or computing device as seen in the resultant media stream 122 in FIG. 1. In following with the previous basketball game example, the resulting basketball game media stream is incorporated with the basketball specific advertisements and are provided in a seamless session for the user.

Figure 4:
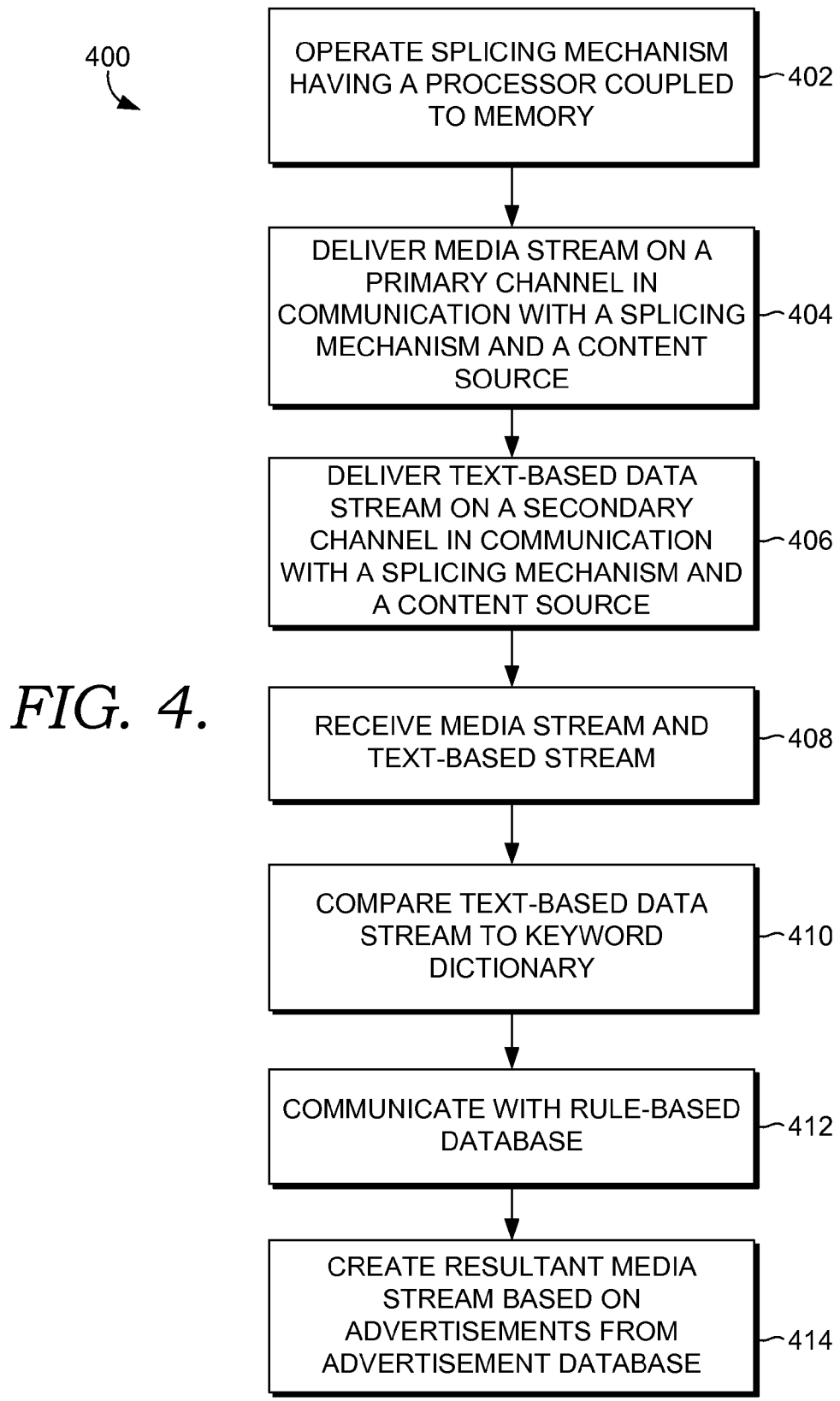
FIG. 4 depicts an illustrative flow diagram according to an embodiment of the present invention for delivering advertisements in a media stream.

Turning now to FIG. 4, a process for an advertisement integration system of 100 in FIG. 1 is shown in method 400. The method begins at step 402, to operate a splicing mechanism having a processor coupled to memory and at step 404 a media stream is delivered on a primary channel in communication with the splicing mechanism and a content source. At step 406, a text-based data stream is delivered on a secondary channel in communication with the splicing mechanism and the content source. The media stream and text based stream are received at step 408 and step 410 includes the process comparing the text-based data stream to a keyword dictionary. At step 406 the method communicates with a rule-based database, and finally at step 414 creates a resultant media stream based on advertisements from an advertisement database.

At step 402, the process begins to operate splicing mechanism 102 having a processor 104 coupled to memory 106 as seen in FIG. 1. As mentioned previously, the processor 104 coupled to the memory 106 in the splicing mechanism 102 provides computer executable instructions to implement embodiments of the present invention such as integrating and delivering advertisements in a media stream. As discussed previously, the media stream may include a video stream and/or audio stream.

At step 404, a primary channel 114 in communication with a splicing mechanism 102 and a content source 112 as in FIG. 1 delivers a media stream. As mentioned previously, the media stream may also include a multimedia stream, video stream, or audio stream.

In step 406, a text-based data stream is delivered on secondary channel 116 in communication with the splicing mechanism 102 and the content source 112 as in FIG. 1. The text-based stream also includes but should not be limited to a text-based data stream or incoming text words. For clarification purposes, the text-based data stream will also be referred to as the text-based stream. As the name implies, the text-based stream is a text-based stream conversion of the media stream on primary channel 114. The media stream or multimedia stream is converted and delivered as the text-based stream on secondary channel 116. In this case, the text-based stream corresponds to the media stream delivered at step 404.

In step 408, the media stream and the text-based stream are received at the splicing mechanism 102 as in FIG. 1. Embodiments of this step illustrate receiving the text-based data stream prior to receiving the media stream while other embodiments depict receiving the text-based data stream and media stream at the same point in time.

In step 410, the text-based stream is compared to keyword dictionary 110 as in FIG. 1. Embodiments of this step depict cue analyzer 108 comparing the text-based stream to the keyword dictionary 110. Step 410 also includes searching for keywords in the text-based stream. Further embodiments of step 310 include a cue analyzer 108 in FIG. 1 searching for keywords by comparing the text-based stream received from the content source 112 on secondary channel 116 to the keyword dictionary 110. In an implementation of an embodiment, a specific television show is streamed on the primary input channel 212 to the splicing mechanism 202. The corresponding text-based data stream of the specific television show is streamed on the secondary input channel 214 to the splicing mechanism 214. The cue analyzer 208 compares the text-based data stream of the specific show to the keyword dictionary 210 which may contain specific predefined keywords associated with advertisements. So in this example, viewers watching this specific television show may be more partial to a particular vehicle type such as Jeep which may be considered a predefined keyword. Thus, the cue analyzer 208 searches the text-based data stream for the keyword Jeep.

In step 412, a rule-based database 118 as in FIG. 1 is communicated with to acquire advertisement rule regulation information. Embodiments of step 412 include splicing mechanism 102 communicating with the rule-based database 118 to acquire advertisement regulation information. Embodiments of the advertisement regulation information includes but should not be limited to advertising organization rules, advertising placement rules, cue requirements, or other advertising cue regulation information. One example includes regulatory information specifying how many advertisements to insert for a particular time period in the media stream and the type of advertisements to insert.

In step 414, resultant media stream 122 is created based on advertisements from advertisement database 120 as in FIG. 1 and the media stream received at step 408. Embodiments of step 414 also include delivering the resultant media stream 122 to a user and/or computing device.

Figure 5:
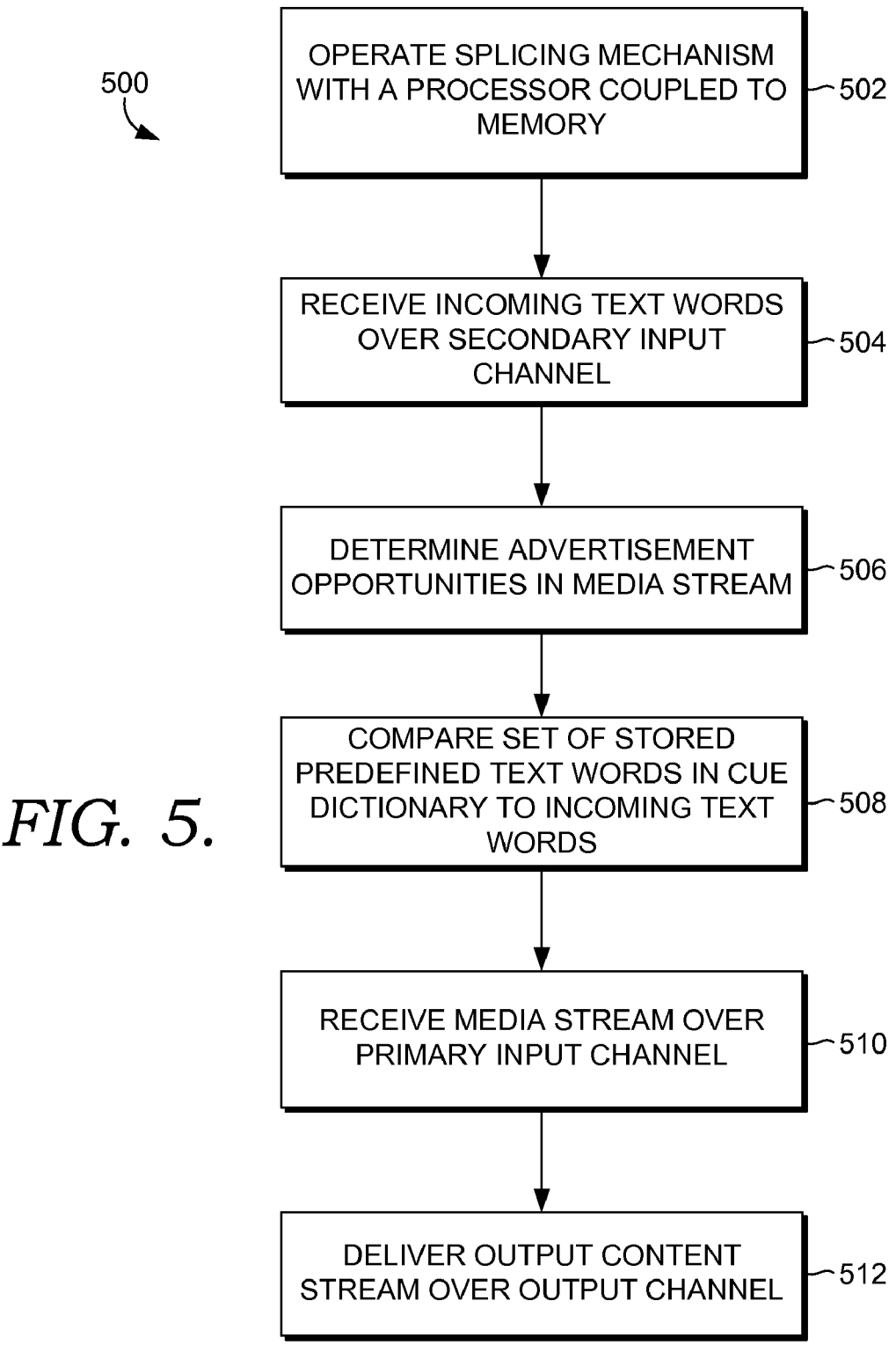
FIG. 5 depicts an illustrative flow diagram according to an embodiment of the present invention for combining advertisements and a media stream.

In an implementation of an embodiment of the present invention, a method of combining advertisements and a media stream is depicted by the process 500 of FIG. 5. The process begins at step 502 to operate the splicing mechanism having a processor coupled to memory. Next, incoming text words are received at step 504 and advertisements opportunities determined by comparing a set of predefined text words in a cue dictionary to a text-based data stream at steps 506 and 508. At step 510, a media stream is received from a primary input channel at step 510, and delivers an output content stream at step 512.

As mentioned previously in FIG. 4, step 502 operates splicing mechanism 202 having a processor 204 coupled to memory 206 as in FIG. 2. As mentioned previously, the processor 204 coupled to the memory 206 in the splicing mechanism 202 provides computer executable instructions to implement embodiments of the present invention such as integrating and delivering advertisements in a media stream. As discussed previously, the media stream may include a video stream and/or audio stream.

At step 504, incoming text words are received over secondary input channel 214 as in FIG. 2. As discussed in FIG. 4, the incoming text words also include text-based stream or text-based data stream. As the name implies, the incoming text words are a text-based stream conversion of the multimedia stream on primary input channel 212. The multimedia stream or media stream is converted and then delivered as the text-based stream on secondary input channel 214. In this case, the text-based stream corresponds to the media stream delivered at step 510.

At step 506, advertisement opportunities are determined in the media stream. Embodiments of step 506 include cue analyzer 208 as in FIG. 2 searching for keywords in the text-based stream. Other embodiments include searching for advertisement insertion points within the media stream by cue analyzer 208 comparing the incoming text words received at step 504 on secondary input channel 214 to cue dictionary 210.

At step 508, a set stored predefined text-words in cue dictionary 210 as in FIG. 2 is compared to the incoming text words. The cue dictionary also includes a keyword dictionary, or storing a set of predefined text words.

At step 510, the media stream is received over primary input channel 212 as in FIG. 2. Although this embodiment depicts receiving the incoming text words prior to receiving media stream, the embodiment of step 510 may also occur prior to receiving the incoming text words.

At step 512, the output content stream is delivered over output channel 216 as in FIG. 2. Embodiments of step 512 include delivering the output content stream to a user and/or computing device. As described previously, an embodiment of the output content stream includes the media stream or the multimedia stream integrated with the advertisements.

The invention claimed is:

1. One or more non-transitory computer-readable storage media having computer-useable instructions embodied thereon that, when executed by a computing device having a processor and a memory, perform a method of communicating advertisements integrated with a multimedia stream, the method comprising:

receiving the multimedia stream and a text-based stream, the text-based stream comprising a flow of data that includes a text-based conversion of the multimedia stream;

searching the text-based stream for one or more keywords useable to identify one or more advertisements to integrate into the multimedia stream;

communicating the one or more keywords to an advertising rule database;

receiving one or more cue requirements from the advertising rule database based on the one or more keywords;

receiving the one or more advertisements to cue for play; and integrating the one or more advertisements with the multimedia stream based on the one or more cue requirements to provide a resulting media stream.

2. The media of claim 1, wherein receiving the multimedia stream and the text-based stream further comprises, receiving the text-based stream before the multimedia stream.

3. The media of claim 2, wherein receiving the multimedia stream and the text-based stream further comprises, receiving the multimedia stream and the text-based stream from a database or a file server.

4. The media of claim 1, wherein the method further comprises, searching for one or more advertisement insertion points within the text-based stream.

5. The media of claim 1, wherein the method further comprises, communicating a request for the one or more advertisements to an advertising database based on the one or more keywords.

6. The media of claim 5, wherein the method further comprises, determining a number of advertisement opportunities, wherein the number of advertisement opportunities are the one or more advertisement insertion points based on the one or more keywords.

7. The media of claim 6, wherein the method further comprises, communicating the resulting media stream to one or more computing devices.

8. The media of claim 1, wherein the multimedia stream and the text-based stream are received substantially simultaneously.

9. The media of claim 1, wherein at least a portion of the multimedia stream is received prior to receiving the text-based stream.

10. A system having at least one processor and a memory for delivering advertisements in a media stream, the system comprising:

a splicing mechanism with the processor coupled to the memory and having a keyword dictionary and a cue analyzer, the cue analyzer operable to compare a text-based data stream to the keyword dictionary to determine one or more advertisement opportunities, the text-based data stream comprising a text-based conversion of a media content stream;

a media-content-stream receiving component configured to receive the media-content stream and the text-based data stream from a media-content source, the media-content stream being received via a primary channel, and the text-based data stream being received via a secondary channel;

a rule-based database that includes one or more rules that instruct insertion of advertisements into the media-content stream; and an advertisement database configured to provide one or more advertisements to the splicing mechanism for insertion into the media-content stream to create a resultant media stream.

11. The system of claim 10, wherein the keyword dictionary includes a list of predefined keywords to compare against keywords in the text-based data stream.

12. The system of claim 10, wherein the media-content stream is an audio stream or a video stream.

13. The system of claim 10, wherein the resultant media stream is communicated to one or more computing devices via an output channel.

14. The system of claim 13, wherein the resultant media stream includes the one or more advertisements and the media stream.

15. The system of claim 10, wherein the rule-based database includes a set of advertising organization rules.

16. An apparatus capable of combining advertisements and a media stream, comprising:

a splicing mechanism with a processor coupled to a memory, the splicing mechanism including a cue dictionary for holding a set of predefined text words associated with one or more advertisement opportunities, and a cue analyzer for identifying the one or more advertisement opportunities within the media stream based on a comparison of a stream of one or more incoming text words to the set of predefined text words, the stream of the one or more incoming text words being a product of a text-based conversion of the media stream, wherein the media stream is received from a content provider via a primary input channel and the stream of the one or more text words are received from the content provider via a secondary input channel substantially simultaneously with the media stream and, wherein an output content stream is delivered to a computing device via an output channel, the output content stream comprising the media stream and the one or more advertisements.

17. The apparatus of claim 16, wherein the media stream includes an audio stream or a video stream.

18. The apparatus of claim 16, wherein the cue analyzer compares the one or more incoming text words to the set of predefined text words in the cue dictionary.

* * * * *